US010218875B2

(12) United States Patent
Asakura

(10) Patent No.: US 10,218,875 B2
(45) Date of Patent: Feb. 26, 2019

(54) COMMUNICATION DEVICE CAPABLE OF PERFORMING WIRELESS COMMUNICATION ACCORDING TO NFC STANDARD

(71) Applicant: BROTHER KOGYO KABUSHIKI KAISHA, Nagoya-shi, Aichi (JP)

(72) Inventor: Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/712,282

(22) Filed: Sep. 22, 2017

(65) Prior Publication Data

US 2018/0097967 A1 Apr. 5, 2018

(30) Foreign Application Priority Data

Sep. 30, 2016 (JP) ................................. 2016-194561

(51) Int. Cl.
| | | |
|---|---|---|
| *G06K 15/00* | (2006.01) | |
| *H04N 1/333* | (2006.01) | |
| *H04W 4/80* | (2018.01) | |
| *H04N 1/00* | (2006.01) | |
| *H04N 1/44* | (2006.01) | |

(52) U.S. Cl.
CPC ..... *H04N 1/33346* (2013.01); *H04N 1/00307* (2013.01); *H04N 1/33323* (2013.01); *H04N 1/33392* (2013.01); *H04N 1/4433* (2013.01); *H04W 4/80* (2018.02); *H04N 2201/006* (2013.01); *H04N 2201/0041* (2013.01);

(Continued)

(58) Field of Classification Search
CPC ........... H04N 1/33346; H04N 1/33392; H04N 1/33323; H04N 1/4433; H04N 1/00307; H04N 2201/006; H04N 2201/0041; H04N 2201/0094; H04N 2201/3205; H04N 2201/33342; H04W 4/80; H04W 4/008

See application file for complete search history.

(56) References Cited

U.S. PATENT DOCUMENTS

| | | | | |
|---|---|---|---|---|
| 2010/0022187 A1* | 1/2010 | Ohkita | ............. | H04W 52/0261 455/41.2 |
| 2013/0084803 A1* | 4/2013 | Hall | ................. | H04W 52/0277 455/41.1 |

(Continued)

FOREIGN PATENT DOCUMENTS

JP 2014-192821 A 10/2014

*Primary Examiner* — Henok Shiferaw

(74) *Attorney, Agent, or Firm* — Scully, Scott, Murphy & Presser, PC

(57) ABSTRACT

A communication device may receive a first specific signal from a terminal device via an NFC interface, determine whether the first specific signal includes install information, change an operation mode of the NFC interface from Reader mode to CE mode in a case where it is determined that the first specific signal does not include the install information, change the operation mode of the NFC interface from Reader mode to Writer mode in a case where it is determined that the first specific signal includes the install information, supply first identification information to the NFC interface in a case where the NFC interface operates in CE mode, and supply specific information different from the first identification information to the NFC interface in a case where the NFC interface operates in Writer mode.

11 Claims, 9 Drawing Sheets

(52) U.S. Cl.
CPC ........... *H04N 2201/0094* (2013.01); *H04N 2201/3205* (2013.01); *H04N 2201/33342* (2013.01)

(56) References Cited

U.S. PATENT DOCUMENTS

| | | | |
|---|---|---|---|
| 2014/0009791 A1* | 1/2014 | Asakura | G06K 15/4045 358/1.15 |
| 2014/0335784 A1* | 11/2014 | Ozenne | H04B 5/0031 455/41.1 |
| 2014/0349577 A1 | 11/2014 | Matsuda | |
| 2015/0188611 A1* | 7/2015 | Tsuzuki | H04B 5/02 455/41.1 |
| 2016/0192124 A1 | 6/2016 | Matsuda | |
| 2018/0070399 A1* | 3/2018 | Tsujii | H04W 76/14 |

* cited by examiner

FIG. 2
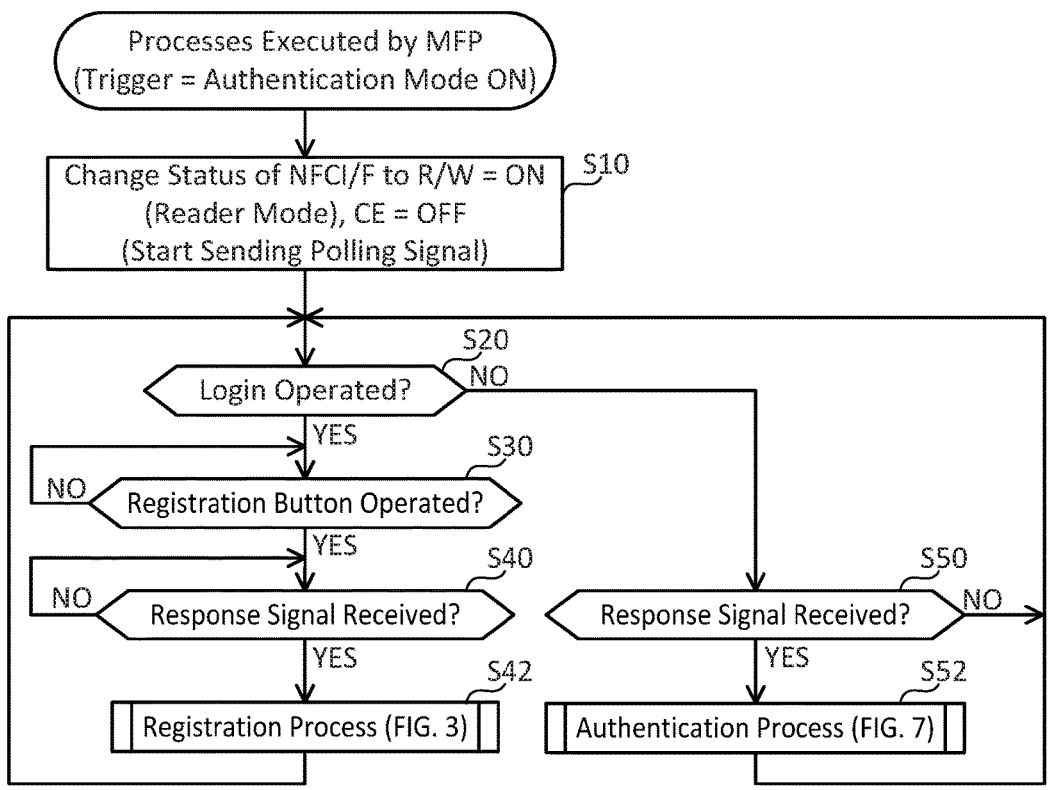
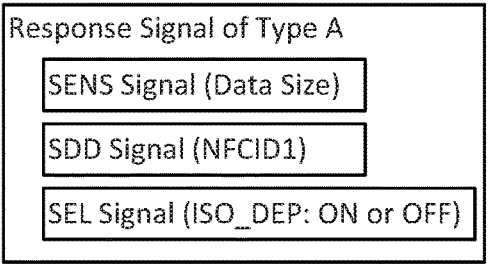
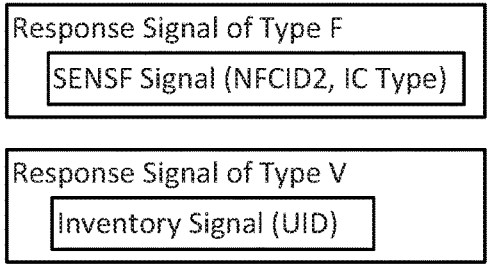

FIG. 4

| Communication Type | | Determination Method | Target Device |
|---|---|---|---|
| Type A | | Not Supporting ISO_DEP | Authentication Card of Mifare Type |
| | | Supporting ISO_DEP and Data Size = 7bytes | Authentication Card of Mifare Desfire Type |
| | | Supporting ISO_DEP and Data Size = 4bytes | Mobile Terminal |
| Type F | | IC Type is Predetermined Type | Mobile Terminal |
| | | IC Type is not Predetermined Type | Authentication Card |
| Type V | | — | Authentication Card |

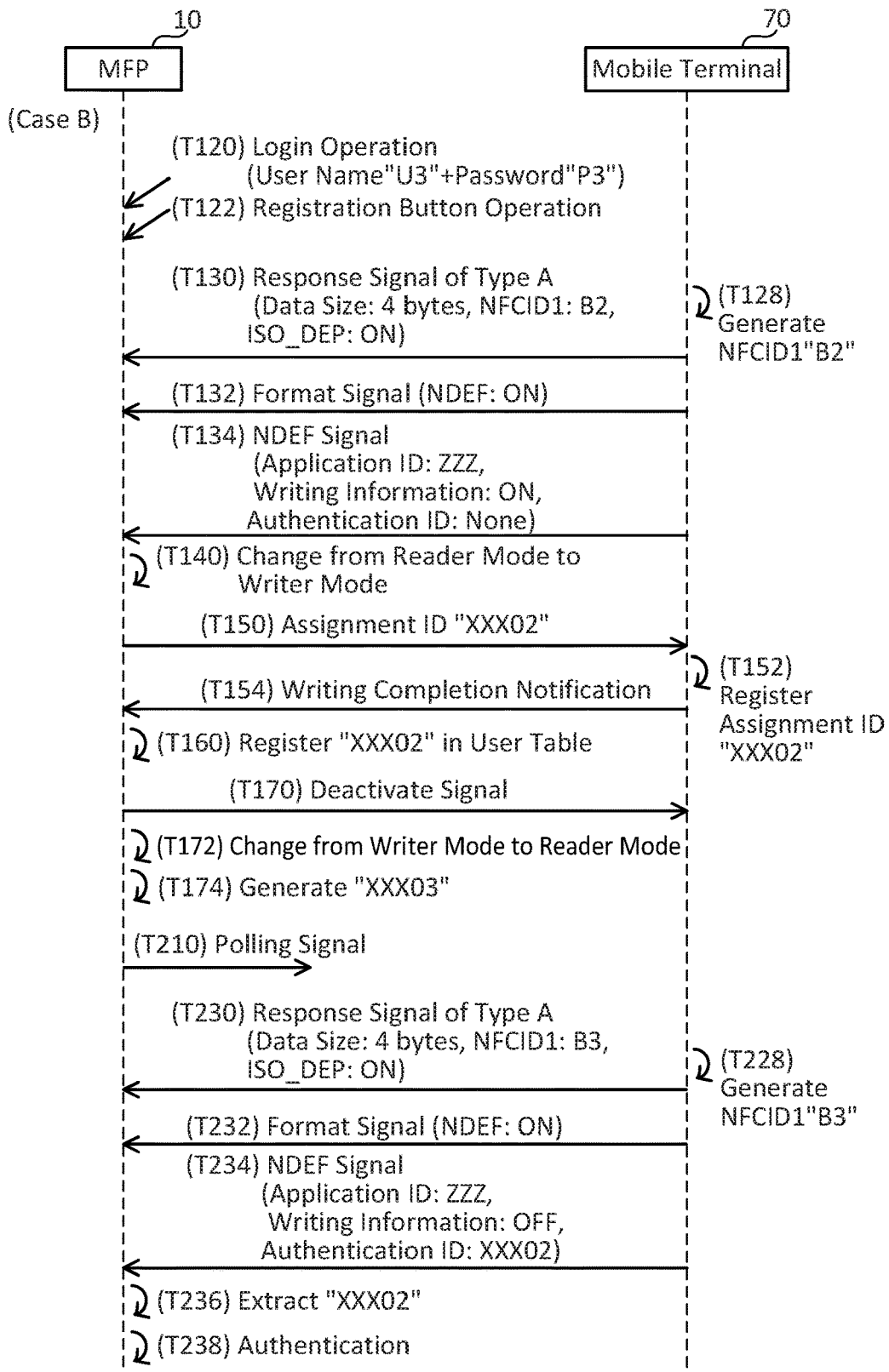

COMMUNICATION DEVICE CAPABLE OF PERFORMING WIRELESS COMMUNICATION ACCORDING TO NFC STANDARD

TECHNICAL FIELD

The present disclosure discloses a communication device capable of performing a wireless communication according to NFC (abbreviation of Near Field Communication) standard.

BACKGROUND ART

A communication system including a multi-function peripheral, a mobile terminal, and a PC is known. The PC sends a print job to the multi-function peripheral. In a case where an application URL supply mode has been turned ON by a user, the multi-function peripheral changes an operation mode of the multi-function peripheral to a CE mode of the NFC standard, and sends a URL for installing an application to the mobile terminal. In a case where the application URL supply mode has been turned OFF by the user and the print job is being stored, the multi-function peripheral changes the operation mode of the multi-function peripheral to a Reader mode of the NFC standard, executes an authentication of the mobile terminal, and executes printing according to the print job in a case where the authentication succeeds.

SUMMARY

The present disclosure provides a technique for changing an operation mode of an NFC interface of a communication device by using a method different from the technique described above.

A communication device may comprise an NFC (abbreviation of Near Field Communication) interface configured to perform a wireless communication according to NFC standard; a processor; and a memory storing computer-readable instructions therein, the computer-readable instructions, when executed by the processor, causing the communication device to: receive a first specific signal from a terminal device via the NFC interface in a case where the NFC interface operates in a Reader mode of the NFC standard and the terminal device operates in a CE (abbreviation of Card Emulation) mode of the NFC standard; determine whether the first specific signal includes install information which indicates that a predetermined application has been installed in the terminal device; change an operation mode of the NFC interface from the Reader mode to the CE mode in a case where it is determined that the first specific signal does not include the install information; change the operation mode of the NFC interface from the Reader mode to the Writer mode in a case where it is determined that the first specific signal includes the install information; supply first identification information to the NFC interface in a case where the NFC interface operates in the CE mode, the first identification information being for identifying the predetermined application and for the terminal device to install the predetermined application, wherein the NFC interface sends the first identification information to the terminal device in a case where the NFC interface operates in the CE mode and the terminal device operates in the Reader mode; and supply specific information different from the first identification information to the NFC interface in a case where the NFC interface operates in the Writer mode, wherein the NFC interface sends the specific information to the terminal device in a case where the NFC interface operates in the Writer mode and the terminal device operates in the CE mode.

A control method, computer-readable instructions, and a non-transitory computer-readable recording medium in which the computer-readable instructions are stored for implementation of the communication device described above, are also novel and useful. Moreover, a communication system comprising the above-described communication device and terminal device is also novel and useful.

BRIEF DESCRIPTION OF THE DRAWINGS

FIG. 2 shows a flowchart of processes executed by an MFP;
FIG. 4 shows a table for describing methods for determining a type of a target device;
FIG. 9 shows a sequence diagram of a case B of executing an authentication.

EMBODIMENTS (Configuration of Communication System 2; FIG. 1)

As shown in FIG. 1, a communication system 2 comprises a multi-function peripheral 10 (called "MFP (abbreviation of Multi-Function Peripheral)" below), and a mobile terminal 70. The devices 10, 70 are capable of performing a wireless communication (called "NFC communication" below) according to the NFC (abbreviation of Near Field Communication) system. In a case of receiving authentication ID from the mobile terminal 70 by using the NFC communication, the multi-function peripheral 10 is capable of executing an authentication (i.e., authentication of a user of the mobile terminal 70) by using the authentication ID. Further, the multi-function peripheral 10 can receive the authentication ID from an authentication card 50 by using the NFC communication and, in this case, executes an authentication (i.e., authentication of a user of the authentication card 50) by using the authentication ID.

(Configuration of MFP 10)

Figure 1:
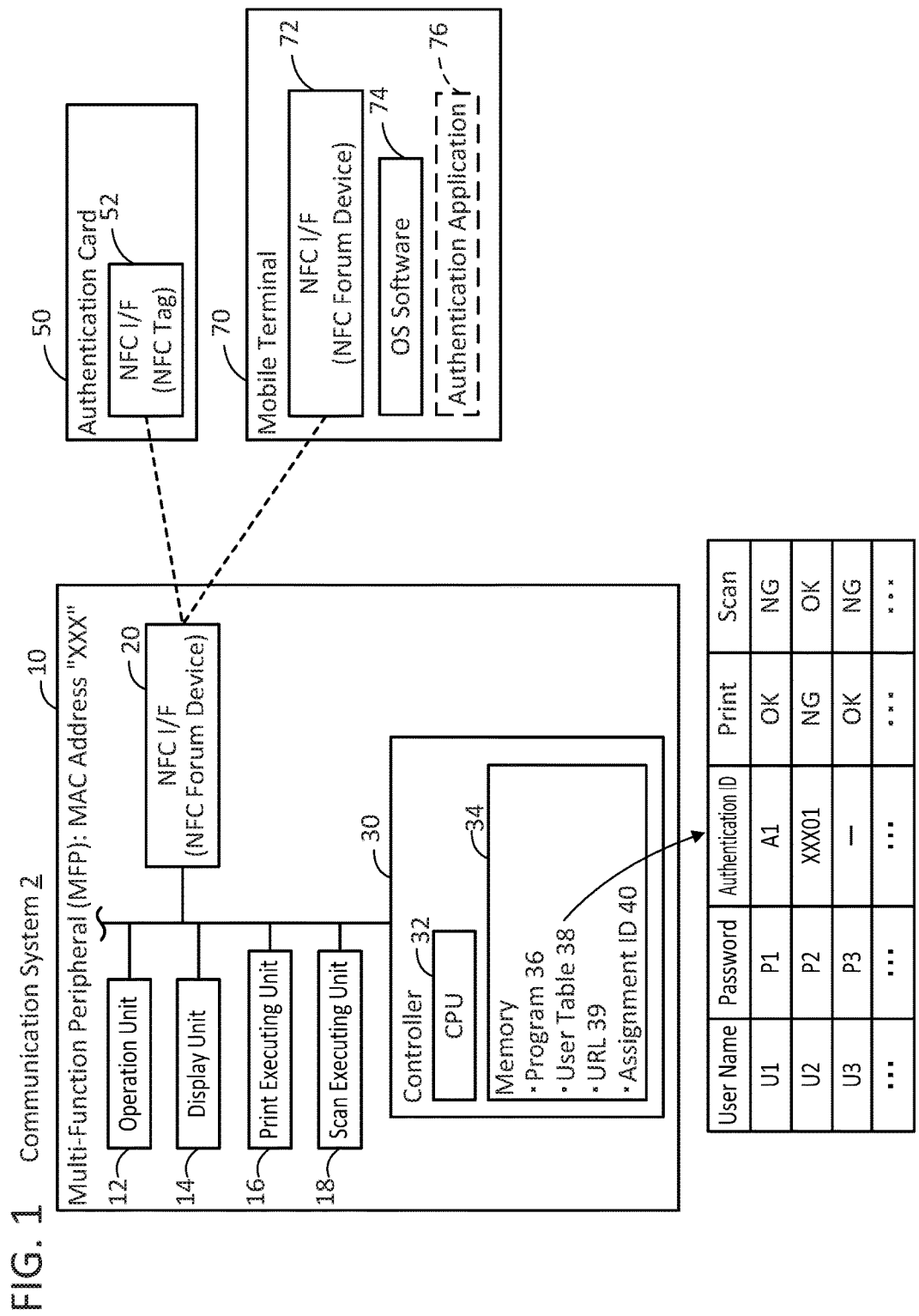
FIG. 1 shows a configuration of a communication system.

The MFP 10 is a peripheral device (i.e., a peripheral device of the mobile terminal 70, etc.) capable of executing multiple functions including a printing function and a scanning function. The MFP 10 comprises an operation unit 12, a display unit 14, a print executing unit 16, a scan executing unit 18, an NFC I/F 20, and a controller 30.

The operation unit 12 comprises a plurality of keys. The user can input various instructions to the MFP 10 by operating the operation unit 12. The display unit 14 is a display for displaying various information. The display unit 14 also functions as a so-called touch panel. That is, the display unit 14 also functions as an operation unit. The print executing unit 16 comprises a printing mechanism, such as an ink jet scheme, a laser scheme, or the like. The scan executing unit 18 comprises a scanning mechanism, such as a CCD, a CIS, or the like.

The NFC I/F 20 is an I/F for executing the NFC communication. The NFC system is a wireless communication system based on international standards such as e.g., ISO/IEC14443, 15693, 18092. It should be noted that an I/F called an NFC forum device, and an I/F called an NFC tag, are known as types of I/F for executing the NFC communication. The NFC forum device is an I/F capable of selectively operating in any one of a P2P (abbreviation of Peer To Peer) mode, an R/W (abbreviation of Reader/Writer) mode, and CE (abbreviation of Card Emulation) mode. The NFC tag is not an I/F capable of selectively operating in any of these modes, but functions as an IC (abbreviation of Integrated Circuit) tag of the NFC system.

The P2P mode is a mode for performing bidirectional communication between one NFC apparatus operating in the P2P mode and another NFC apparatus operating in the P2P mode. The R/W mode and the CE mode are modes for performing unidirectional communication between one NFC apparatus operating in the R/W mode and another NFC apparatus operating in the CE mode. It should be noted that the CE mode may be a CE mode requiring a secure element, or an HCE (abbreviation of Host Card Emulation) mode not requiring a secure element. The Reader mode in the R/W mode is a mode for reading out data from an NFC apparatus operating in the CE mode. The Writer mode in the R/W mode is a mode for writing data to an NFC apparatus operating in the CE mode. It should be noted that an NFC apparatus operating in the R/W mode can read out data from an NFC tag, and write data to the NFC tag.

The NFC I/F 20 is an NFC forum device, and is capable of operating in the R/W mode and the CE mode, but is incapable of operating in the P2P mode. Since the NFC I/F 20 is incapable of operating in the P2P mode, the configuration of the NFC I/F 20 can be simplified, and consequently the cost of the NFC I/F 20 can be reduced.

The controller 30 comprises a CPU 32 and a memory 34. The CPU 32 performs various processes in accordance with a program 36 stored in the memory 34. The memory 34 is configured by a volatile memory, non-volatile memory, etc. Further, in addition to the program 36, the memory 34 stores a user table 38, a URL (abbreviation of Uniform Resource Locator) 39, and an assignment ID 40. The URL 39 is location information on the Internet of an authentication application 76 to be installed on a terminal device (e.g., the mobile terminal 70). The assignment ID 40 is a character string indicating an ID to be assigned to the terminal device. The assignment ID 40 includes a combination of a MAC address "XXX" of the MFP 10, and a numeral part which is constituted of a multi-digit numeral (numeral in two digits in the present embodiment). The numerical part has "00" as an initial value. Each time the assignment ID 40 is assigned to a terminal device, the numeral of the numerical part is incremented only by "1", to generate the new assignment ID 40. It should be noted that in a modification, the assignment ID 40 may be one in which a plurality of character strings is randomly selected.

A user name, a password, an authentication ID, print permission information, and scan permission information are associated with each other in the user table 38. The user name, the password, the print permission information and the scan permission information are registered in the user table 38 by, e.g., an administrator of the MFP 10 operating the operation unit 12, or by accessing the MFP 10 from a terminal device. The print permission information and the scan permission information respectively indicate whether or not the user is permitted to perform the printing function and the scanning function. "OK" in the permission information indicates that use of its corresponding function is permitted, and "NG" indicates that use of its corresponding function is not permitted. The authentication ID is identification information for identifying the authentication card 50 or the mobile terminal 70, and is registered by a registration process (FIG. 3) to be described later. It should be noted that, in a modification, the user table 38 may be stored in a memory of an external device different from the MFP 10. In this case, the MFP 10 can communicate with the external device to use the information in the user table 38.

(Configuration of Authentication Card 50)

The authentication card 50 comprises an NFC I/F 52 which is an NFC tag. The authentication card 50 usually does not have OS software and applications. The NFC I/F 52 corresponds to one type of types A, F, and V (in other words, supports only one type). The NFC I/F 52 corresponding to type A is an I/F (i.e., card) conforming to communication standard "ISO/IEC14443" and is further classified into an I/F conforming to specific standard "ISO/IEC14443-4" conforming to communication standard "ISO/IEC14443", and an I/F not conforming to specific standard "ISO/IEC14443-4". The former I/F is a Mifare Desfire type card conforming to a specific communication protocol "T-CL" for non-contact cards. Further, the latter I/F is a Mifare (registered trademark) type card not conforming to the communication protocol "T-CL". The NFC I/F 52 corresponding to type F is a card conforming to communication standard "ISO/IEC18092", e.g., a card such as FeliCa (registered trademark) Standard, FeliCa Lite, etc. Further, the NFC I/F 52 corresponding to type V is a card conforming to communication standard "ISO/IEC15693".

(Configuration of Mobile Terminal 70)

The mobile terminal 70 is a portable terminal device such as a mobile telephone, a smartphone, a PDA, a notebook PC, a tablet PC, a portable music playback device or a portable movie playback device. The mobile terminal 70 comprises an NFC I/F 72 and an OS software 74. The NFC I/F 72 is an NFC forum device. The NFC I/F 72 is capable of operating in the R/W mode and the CE mode. The NFC I/F 72 may be capable of or incapable of operating in the P2P mode. The OS software 74 is software for controlling various basic operations of the mobile terminal 70.

The mobile terminal 70 may further comprise the authentication application 76. The authentication application 76 is an application for causing the MFP 10 to execute an authentication by using the mobile terminal 70. The authentication application 76 is an application provided by a vendor of the MFP 10, and is installed in the mobile terminal 70 from, e.g., a server on the Internet.

(Processes Executed by MFP 10; FIG. 2)

Next, processes executed by the CPU 32 in a case where an authentication mode of the MFP 10 has been set to ON will be described with reference to FIG. 2. The authentication mode is a mode in which an NFC communication with a target device (e.g., the authentication card 50, the mobile terminal 70) is to be performed, and processes related to authentication are to be executed. The processes of FIG. 2 are started when an operation for changing the authentication mode from OFF to ON is performed on the operation unit 12 by the user.

In S10, the CPU 32 supplies an instruction for changing the operation mode to the NFC I/F 20, changing the operation mode of the NFC I/F 20 to "R/W mode=ON" and "CE mode=OFF". Here, "R/W mode=ON" means that the NFC I/F 20 is capable of executing an operation (e.g., sending of a Polling signal) in accordance with the R/W mode. Further, "CE mode=OFF" means that the NFC I/F 20 is incapable of executing an operation (e.g., sending of a response signal to the Polling signal) in accordance with the CE mode. In particular, in S10, the CPU 32 supplies an instruction for operating in Read Only to the NFC I/F 20, and operates the NFC I/F 20 in only the Reader mode of the R/W mode. Consequently, the NFC I/F 20 is capable of executing an operation in accordance with the Reader mode (e.g., readout of information from the target device (i.e., receiving information)), but is incapable of executing an operation in accordance with the Writer mode (e.g., writing of information to the target device (i.e., sending information)).

In S10, further, the CPU 32 instructs the NFC I/F 20 to send Polling signals corresponding to each type of types A, F, and V. As a result, the NFC I/F 20 repeatedly sends each Polling signal corresponding to each type in sequence.

In S20, the CPU 32 monitors whether a login operation has been executed on the operation unit 12 by the user. In a case where the combination of the user name and password registered in the user table 38 has been input in the operation unit 12, the CPU 32 determines YES in S20, and proceeds to S30.

In S30, the CPU 32 monitors whether a registration button for registering the authentication ID in the user table 38 has been operated. In a case where the registration button has been operated, the CPU 32 determines YES in S30, and proceeds to S40.

In S40, the CPU 32 monitors whether a response signal to the Polling signal has been received from the target device via the NFC I/F 20. As described above, the NFC I/F 20 repeatedly sends each Polling signal corresponding to each type of types A, F, and V in sequence. In case of receiving a response signal to a Polling signal corresponding to any type, the NFC I/F 20 establishes an NFC communication session with the target device. For example, in case of receiving a response signal to a Polling signal corresponding to type A when the Polling signal was sent, the NFC I/F 20 supplies information indicating type A to the controller 30. Similarly, in case of receiving a response signal corresponding to another communication type, the NFC I/F 20 supplies information indicating that type and information within the response signal to the controller 30. In case of acquiring this information from the NFC I/F 20, the CPU 32 determines YES in S40, and proceeds to S42.

The response signal of type A includes an SENS (abbreviation of SENS_RES Response) signal, an SDD (abbreviation of SDD_RES Response) signal, and an SEL (abbreviation of SEL_RES Response) signal. The SENS signal includes information indicating data size of an NFCID1, which is a device ID of the type A. The SDD signal includes the NFCID1. The SEL signal includes ISO_DEP (abbreviation of Data Exchange Protocol defined in ISO/IEC14443-4) information. The ISO_DEP information indicates one value of "ON", meaning that the target device supports ISO_DEP, or "OFF", meaning that the target device does not support ISO_DEP.

The response signal of type F includes an SENSF signal. The SENSF signal includes an NFCID2, which is a device ID of the type F, and an IC type of the NFC I/F of the target device.

The response signal of type V includes an Inventory signal. The Inventory signal includes an UID (abbreviation of Universal ID), which is a device ID of the type V.

As described above, the device ID is an ID having a different name for each communication type. The device IDs corresponding to the communication types A, F and V are "NFCID1", "NFCID2" and "UID", respectively. NFCID1 and NFCID2 are defined respectively by the NFC forum, and UID is not defined by the NFC forum.

In the case where the target device is an authentication card, the device ID is a unique ID pre-assigned to each authentication card. That is, the device ID does not overlap between two or more authentication cards. Consequently, the device ID of an authentication card corresponding to type A, F, or V is suitable for authentication.

Further, in the case where the target device is a mobile terminal, the device ID is usually prepared by OS software. For example, when the response signal to the Polling signal is to be sent, the OS software randomly determines a character string, and determines the character string as the device ID. Consequently, if the device ID received from the mobile terminal is registered in the user table 38, the device ID received from the mobile terminal thereafter is usually different from the registered device ID. Consequently, the device ID received from the mobile terminal is not suitable for authentication. Consequently, in the present embodiment, the assignment ID 40 prepared by the MFP 10 is assigned to the mobile terminal as the authentication ID, and the authentication is executed using that authentication ID.

In S42, the CPU 32 executes a registration process (see FIG. 3) related to registering the authentication ID of the target device in the user table 38. When S42 ends, the process returns to S20.

Further, in S50, the CPU 32 monitors whether a response signal to the Polling signal has been received from the target device via the NFC I/F 20 without executing the login operation (NO in S20). S50 is the same as S40 and, in case of acquiring information corresponding to the communication type from the NFC I/F 20, the CPU 32 determines YES in S50, and proceeds to S52.

In S52, the CPU 32 executes an authentication process (see FIG. 7) related to authentication of the target device. When S52 ends, the process returns to S20.

Figure 3:
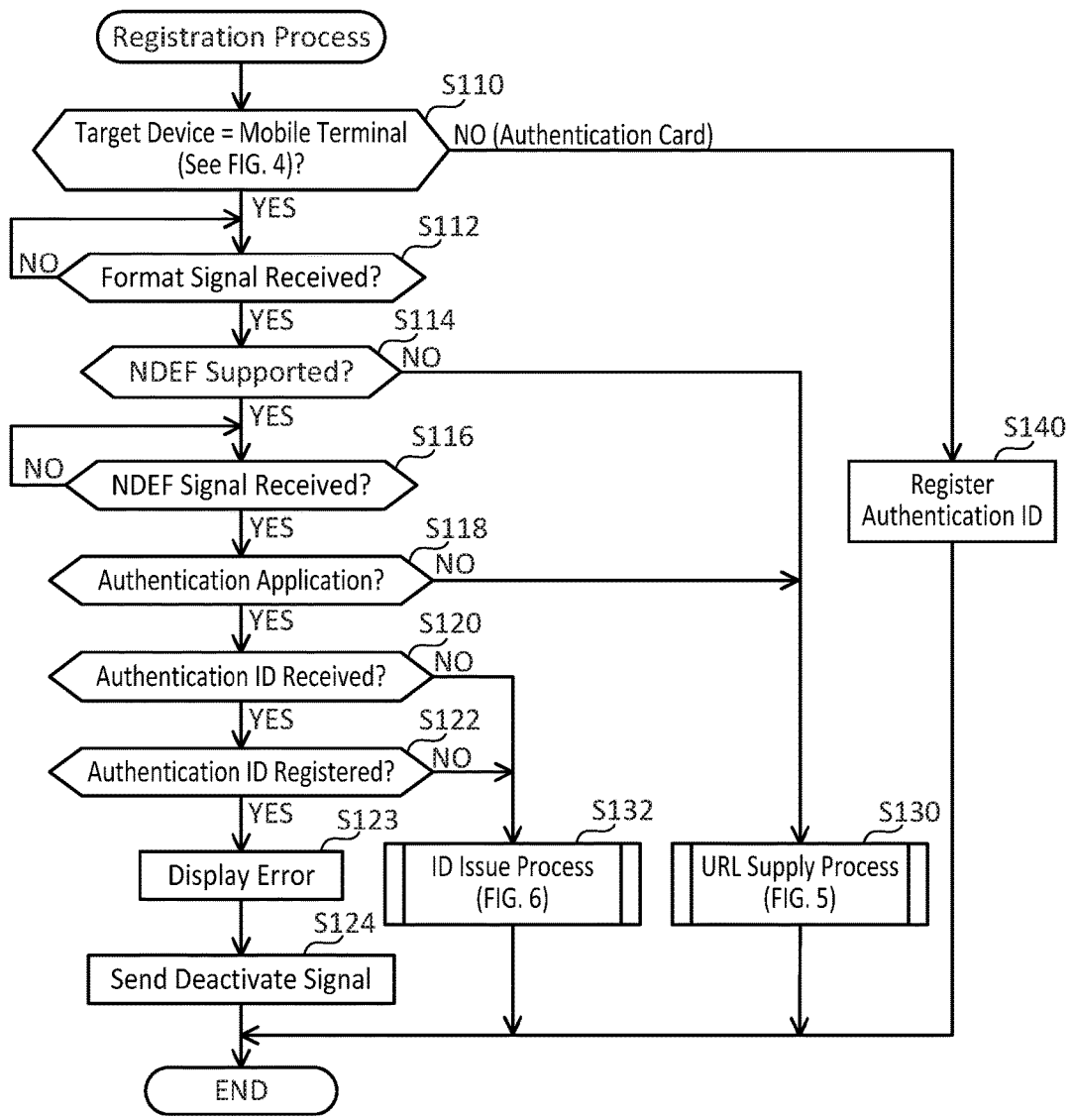
FIG. 3 shows a flowchart of a registration process.

(Registration Process; FIG. 3)

Next, contents of the registration process executed in S42 of FIG. 2 will be described with reference to FIG. 3. In S110, the CPU 32 determines whether the target device is the mobile terminal 70 or the authentication card 50. Specifically, the CPU 32 executes the determination of S110 in the manner described below by using the information acquired in S40 of FIG. 2 (i.e., the information indicating the type and the information in the response signal), and the table shown in FIG. 4.

In a case where the communication type of the target device is type A, the CPU 32 specifies the type of the target device by using the data size information included in the SENS signal, and the ISO_DEP information included in the SEL signal. The CPU 32 determines that the target device is the Mifare type authentication card 50 in a case where the ISO_DEP information is "OFF", determines that the target device is the Mifare Desfire type authentication card 50 in a case where the ISO_DEP information is "ON" and the data size information is "7 bytes", and determines that the target device is the mobile terminal 70 in a case where the ISO_DEP is "ON" and the data size information is "4 bytes".

Further, in a case where the communication type of the target device is type F, the CPU 32 specifies the type of the target device by using the IC type included in the SENSF signal. The CPU 32 determines that the target device is the mobile terminal 70 in a case where the IC type is a predetermined type (e.g., 06*h,* 07*h,* 10*h* to 13*h,* and 14*h* to 1Fh), and determines that the target device is the authentication card 50 in a case where the IC type is not the predetermined type.

In a case where the communication type of the target device is type V, the target device cannot be the mobile terminal 70, and is the authentication card 50. Consequently, in the case where the communication type of the target device is type V, the CPU 32 determines that the target device is the authentication card 50.

In case of determining that the target device is the authentication card 50 (NO in S110), the CPU 32 proceeds to S140. In the case where the target device is the authentication card 50, the device ID of the target device can be used for the authentication of the target device. Consequently, in S140, the CPU 32 registers the device ID acquired in S40 of FIG. 2 in the user table 38 as the authentication ID corresponding to the user name and password input in S20 of FIG. 2. That is, the CPU 32 registers the NFCID1 if the target device is the authentication card 50 corresponding to type A, registers the NFCID2 if the target device is the authentication card 50 corresponding to type F, and registers the UID if the target device is the authentication card 50 corresponding to type V.

On the other hand, in case of determining that the target device is the mobile terminal 70 (YES in S110), the CPU 32 proceeds to S112. In S112, the CPU 32 monitors whether a Format signal has been received. The NFC I/F 20 sends a request signal to the mobile terminal 70, and receives a Format signal including Format information from the mobile terminal 70. In case of receiving the Format signal, the NFC I/F 20 supplies the Format information to the controller 30. In this case, the CPU 32 determines YES in S112, and proceeds to S114. The Format information indicates either value of "ON", meaning that the mobile terminal 70 is capable of executing communication of the NDEF signal, or "OFF", meaning that the mobile terminal 70 is incapable of executing communication of the NDEF signal. In the mobile terminal 70, the Format information is set to "ON" in a case where any application using the NDEF has been installed.

In S114, based on the Format information, the CPU 32 determines whether the mobile terminal 70 supports NDEF. In a case where the Format information indicates "ON", the CPU 32 determines that the mobile terminal 70 supports NDEF (YES in S114), and proceeds to S116. On the other hand, in a case where the Format information indicates "OFF", the CPU 32 determines that the mobile terminal 70 does not support NDEF (NO in S114), and proceeds to S130.

In S116, the CPU 32 monitors whether an NDEF signal is received. The NFC I/F 20 sends a request signal to the mobile terminal 70, and receives the NDEF signal from the mobile terminal 70. In case of receiving the NDEF signal, the NFC I/F 20 supplies the NDEF information to the controller 30. In this case, the CPU 32 determines YES in S116, and proceeds to S118. The NDEF information includes ID of an application that has been installed in the mobile terminal 70 (called "application ID" below), and writing information indicating whether writing of information into an NDEF area can be executed. Further, the NDEF information may include the authentication ID of the mobile terminal 70.

In S118, the CPU 32 determines whether the application ID included in the NDEF information acquired in S116 matches an application ID "ZZZ" of the authentication application 76. The CPU 32 proceeds to S120 in a case where the application ID included in the NDEF information matches "ZZZ" (YES in S118), and proceeds to 5130 in a case where the application ID included in the NDEF information does not match "ZZZ" (NO in S118).

In S120, the CPU 32 determines whether the NDEF information acquired in S116 includes the authentication ID. The CPU 32 proceeds to S122 in case of determining that the NDEF information includes the authentication ID (YES in S120). On the other hand, the CPU 32 proceeds to S132 in case of determining that the NDEF information does not include the authentication ID (NO in S120).

In S122, the CPU 32 determines whether the authentication ID included in the NDEF information is registered in the user table 38. The CPU 32 proceeds to S123 in case of determining that the authentication ID included in the NDEF information is registered in the user table 38 (YES in S122). On the other hand, the CPU 32 proceeds to S132 in case of determining that the authentication ID included in the NDEF information is not registered in the user table 38 (NO in S122). For example, a situation is assumed in which, after the assignment ID 40 has been registered in the user table 38 as the authentication ID, an administrator deletes the authentication ID from the user table 38. In this case, the NDEF information includes the authentication ID, but the authentication ID is not registered in the user table 38, and NO is determined in S122.

In S123, the CPU 32 causes the display unit 14 to display an error screen indicating that the authentication ID has been registered in the user table 38. Thus, the user can know that there is no need to register the authentication ID.

In S124, the CPU 32 supplies a sending instruction of a Deactivate signal to the NFC I/F 20. Thus, the NFC I/F 20 sends the Deactivate signal to the mobile terminal 70 and, consequently, the NFC communication session established in S40 of FIG. 2 is disconnected. When S124 ends, the process of FIG. 3 ends.

Further, in S130, the CPU 32 executes a URL supply process (see FIG. 5) for supplying the URL 39 to the mobile terminal 70. When S130 ends, the process of FIG. 3 ends.

Further, in S132, the CPU 32 executes an ID issue process (see FIG. 6) for assigning the assignment ID 40 to the mobile terminal 70 as the authentication ID. When S132 ends, the process of FIG. 3 ends.

Figure 5:
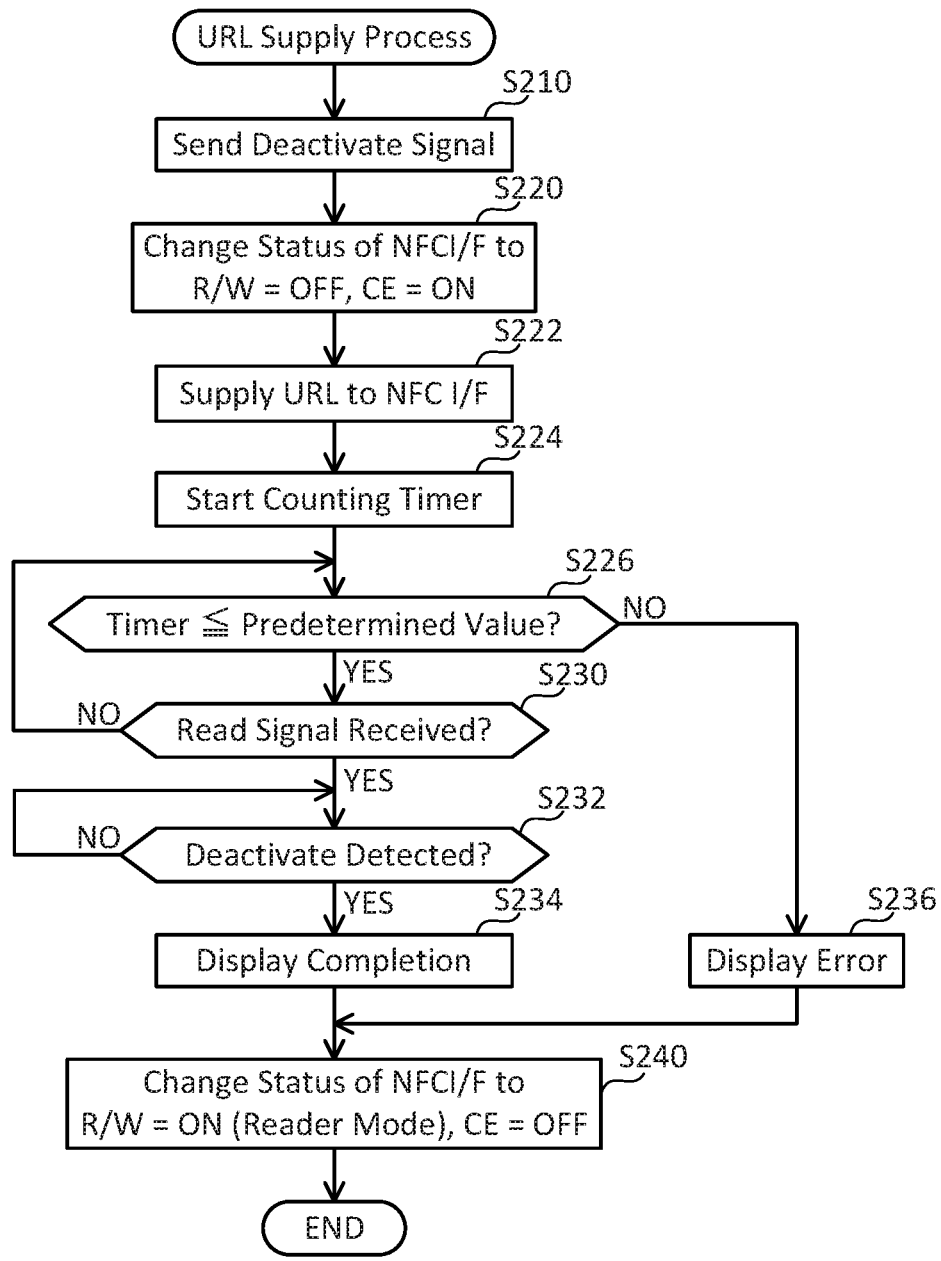
FIG. 5 shows a flowchart of a URL supply process.

(URL Supply Process; FIG. 5)

Next, the URL supply process executed in S130 of FIG. 3 will be described with reference to FIG. 5. The process of FIG. 5 is executed in a case where the target device is the mobile terminal 70, and the mobile terminal 70 does not install the authentication application 76.

S210 is the same as S124 of FIG. 3. In S220, the CPU 32 supplies a change instruction for changing the operation mode to the NFC I/F 20, changing the operation mode of the NFC I/F 20 to "R/W mode=OFF" and "CE mode=ON". Here, "R/W mode=OFF" means that the NFC I/F 20 is incapable of executing the operation in accordance with the R/W mode, and "CE mode=ON" means that the NFC I/F 20 is capable of executing the operation in accordance with the CE mode. When the operation mode is changed in S220, the NFC I/F 20 can receive the Polling signal sent from the mobile terminal 70, and can send a response signal to the Polling signal, and consequently can establish the NFC communication session with the mobile terminal 70 operating in the R/W mode.

In S222, the CPU 32 supplies the URL 39 in the memory 34 to the NFC I/F 20. As a result, the URL 39 is stored in the memory in the NFC I/F 20.

In S224, the CPU 32 starts counting a timer. In S226, the CPU 32 monitors whether the count value of the timer exceeds a predetermined value. In a case where the count value of the timer has exceeded the predetermined value (NO in S226), i.e., an NFC communication session with the mobile terminal 70 has not been established for a long period, in S236, the CPU 32 causes the display unit 14 to display an error screen indicating that the sending of the URL 39 to the mobile terminal 70 has failed. When S236 ends, the process proceeds to S240.

Further, in S230, the CPU 32 monitors whether a Read signal has been received. In case of establishing an NFC communication session with the mobile terminal 70, the NFC I/F 20 receives the Read signal from the mobile terminal 70. Then, the NFC I/F 20 supplies information indicating that the Read signal has been received to the controller 30. In this case, the CPU 32 determines YES in S230, and proceeds to S232. In response to receiving the Read signal, the NFC I/F 20 sends the URL 39 acquired in S222 to the mobile terminal 70 by using the NFC communication session. Moreover, in a modification, the CPU 32 may not supply the URL 39, but an AAR (abbreviation of "Android Application Record") including a package name of the authentication application 76 to the NFC I/F 20, and the NFC I/F 20 may send the AAR to the mobile terminal 70. The package name is a name obtained by arranging a domain in its reverse order, such as "com.example.android.beam".

In S232, the CPU 32 monitors whether Deactivate is detected. When the mobile terminal 70 receives the URL 39 from the MFP 10, a distance between the MFP 10 and the mobile terminal 70 becomes greater than a maximum distance (e.g., 10 cm) in which the NFC communication can be executed in order for the user to execute an operation for installing the authentication application 76 on the mobile terminal 70. Due to this, the NFC communication session with the mobile terminal is disconnected. In this case, the CPU 32 acquires information indicating that the NFC communication session has been disconnected from the NFC I/F 20, determines YES in S232, and proceeds to S234.

In S234, the CPU 32 causes the display unit 14 to display a completion screen indicating that sending of the URL 39 to the mobile terminal 70 has been completed.

In S240, the CPU 32 supplies a change instruction for changing the operation mode to the NFC I/F 20, changing the operation mode of the NFC I/F 20 to "R/W mode=ON" and "CE mode=OFF". Further, the CPU 32 supplies an instruction for operating in Reader Only to the NFC I/F 20, causing the NFC I/F 20 to operate only in the Reader mode of the R/W mode. Thus, the operation mode of the NFC I/F 20 returns to the operation mode of S10 of FIG. 2. That is, the MFP 10 can appropriately return the operation mode of the NFC I/F 20 to the operation mode in the initial status. When S240 ends, the process of FIG. 5 ends.

Figure 6:
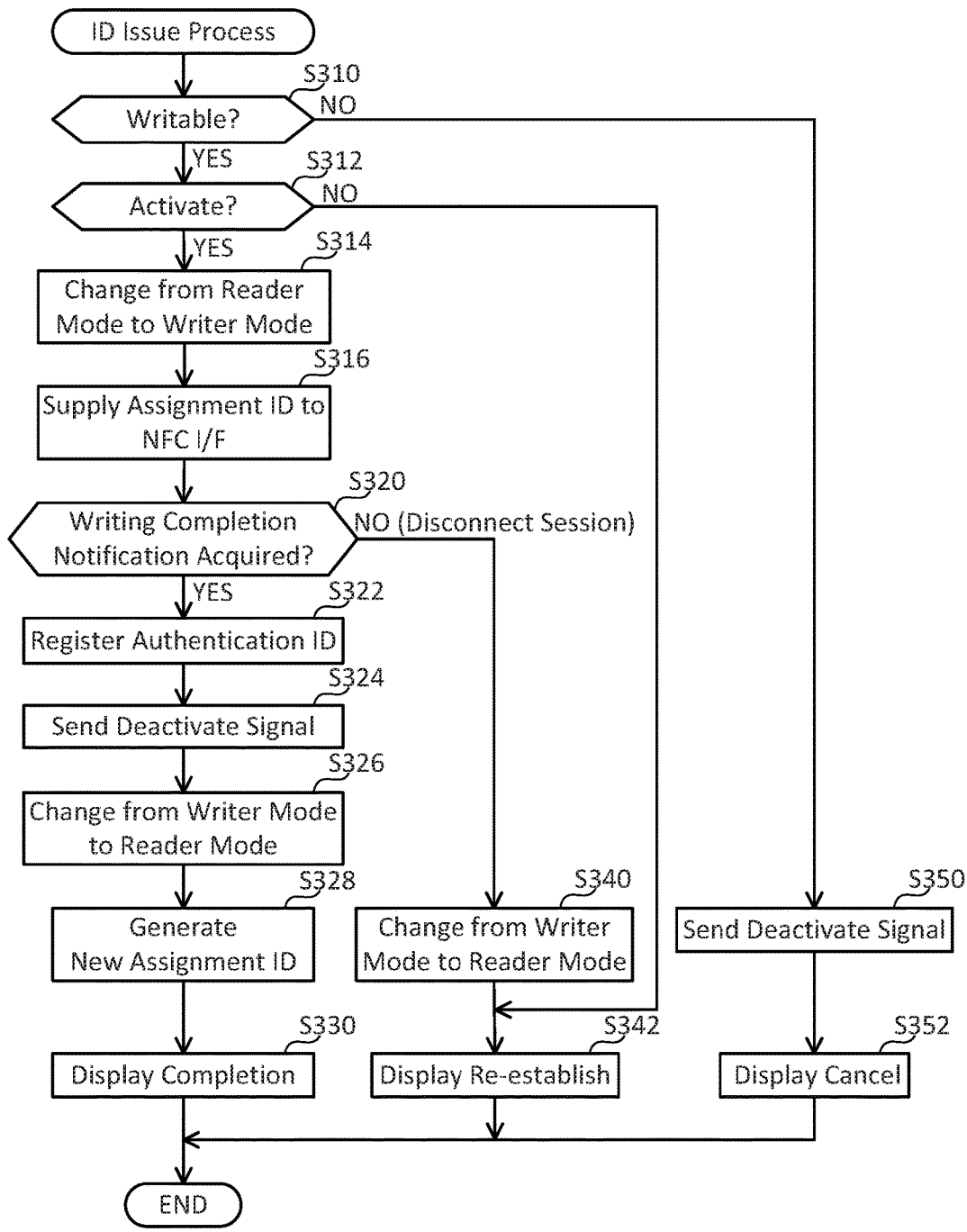
FIG. 6 shows a flowchart of an ID issue process.

(ID Issue Process; FIG. 6)

Next, an ID issue process executed in S132 of FIG. 3 will be described with reference to FIG. 6. The process of FIG. 6 is executed in a case where the target device is the mobile terminal 70, and the authentication application 76 has been installed in the mobile terminal 70.

In S310, the CPU 32 determines whether it is possible to write information to the mobile terminal 70 based on writing information included in the NDEF information acquired in S116 of FIG. 3. The writing information indicates either value of "ON", meaning that the writing of information can be executed, and "OFF", meaning that the writing of information cannot be executed. The CPU 32 proceeds to S312 in a case where the writing information indicates "ON" (YES in S310), and proceeds to S350 in a case where the writing information indicates "OFF" (NO in S310).

S350 is the same as S124 of FIG. 3. In S352, the CPU 32 causes the display unit 14 to display a cancel screen for requesting to cancel the write prohibition in the mobile terminal 70. Thus, the user can cancel the write prohibition by operating the mobile terminal 70. Thus, the writing information is changed from "OFF" to "ON", and it becomes possible to execute writing of the assignment ID 40 (i.e., sending of the assignment ID 40) to the mobile terminal 70. When S352 ends, the process of FIG. 6 ends.

In S312, the CPU 32 determines whether the NFC communication session with the mobile terminal 70 is ongoing (i.e., Activate). The CPU 32 determines YES in S312, and proceeds to S314 in a case where information indicating disconnection of the NFC communication session has not been acquired from the NFC I/F 20 after the establishment of the NFC communication session with the target device in S40 of FIG. 2. For example, when the user moves the mobile terminal 70 away from the MFP 10 before the process of S312, the NFC communication session established in S40 of FIG. 2 is disconnected. In this case, since information indicating disconnection of the NFC communication session is acquired from the NFC I/F 20, the CPU 32 determines NO in S312, and proceeds to S342.

In S342, the CPU 32 causes the display unit 14 to display a re-establish screen which requests re-establishment of the NFC communication session with the mobile terminal 70. Specifically, the re-establish screen includes a message requesting that the mobile terminal 70 be brought closer to the MFP 10. When S342 ends, the process of FIG. 6 ends.

In S314, the CPU 32 supplies an instruction for operating in Write Only to the NFC I/F 20, causing the NFC I/F 20 to operate only in the Writer mode of the R/W mode. Thus, the NFC I/F 20 is capable of executing operation in accordance with the Writer mode (e.g., writing information to the target device (i.e., sending information)), but becomes incapable of executing operation in accordance with the Reader mode (e.g., reading information from the target device (i.e., receiving information)).

In S316, the CPU 32 supplies the assignment ID 40 in the memory 34 to the NFC I/F 20. As a result, the NFC I/F 20 sends the assignment ID 40 to the mobile terminal 70 by using the NFC communication session established in S40 of FIG. 2, and writes the assignment ID 40 to the mobile terminal 70. In this way, without disconnecting the NFC communication session established in S40 of FIG. 2, the MFP 10 can send the assignment ID 40 to the mobile terminal 70 by using the NFC communication session. Consequently, the assignment ID 40 can be sent rapidly to the mobile terminal 70.

In S320, the CPU 32 determines whether a writing completion notification has been acquired. The writing completion notification is sent to the NFC I/F 20 from the mobile terminal 70 in a case where the writing of the assignment ID 40 to the mobile terminal 70 has been completed. Upon receiving the writing completion notification, the NFC I/F 20 supplies the writing completion notification to the controller 30. In this case, the CPU 32 determines YES in S320, and proceeds to S322. For example, when the user moves the mobile terminal 70 away from the MFP 10 before acquiring the writing completion notification, the NFC communication session established in S40 of FIG. 2 is disconnected. In this case, the CPU 32 determines NO in S320, and proceeds to S340.

In S340, the CPU 32 supplies an instruction for operating in Read Only to the NFC I/F 20, causing the NFC I/F 20 to operate only in the Reader mode of the R/W mode. Thereby, the operation mode of the NFC I/F 20 returns to the operation mode of S10 of FIG. 2. In this way, in a case where the NFC communication session is established before the sending of the assignment ID 40 to the mobile terminal 70 is completed, the MFP 10 can appropriately return the operation mode of the NFC I/F 20 to the operation mode in the initial status. When S340 ends, the process of FIG. 6 ends via the process S342.

In S322, the CPU 32 registers the assignment ID 40 in the user table 38 as the authentication ID corresponding to the user name and password input in S20 of FIG. 2. S324 is the same as S124 of FIG. 3. S326 is the same as S340.

In S328, the CPU 32 increments the numerical part of the current assignment ID 40 only by "1" to generate a new assignment ID 40. Thereby, it is possible to prevent an assignment ID that is the same as the assignment ID assigned to the mobile terminal 70 from being assigned to a mobile terminal different from the mobile terminal 70.

In S330, the CPU 32 causes the display unit 14 to display a completion screen indicating that registration of the authentication ID in the user table 38 has been completed. When S330 ends, the process of FIG. 6 ends.

Figure 7:
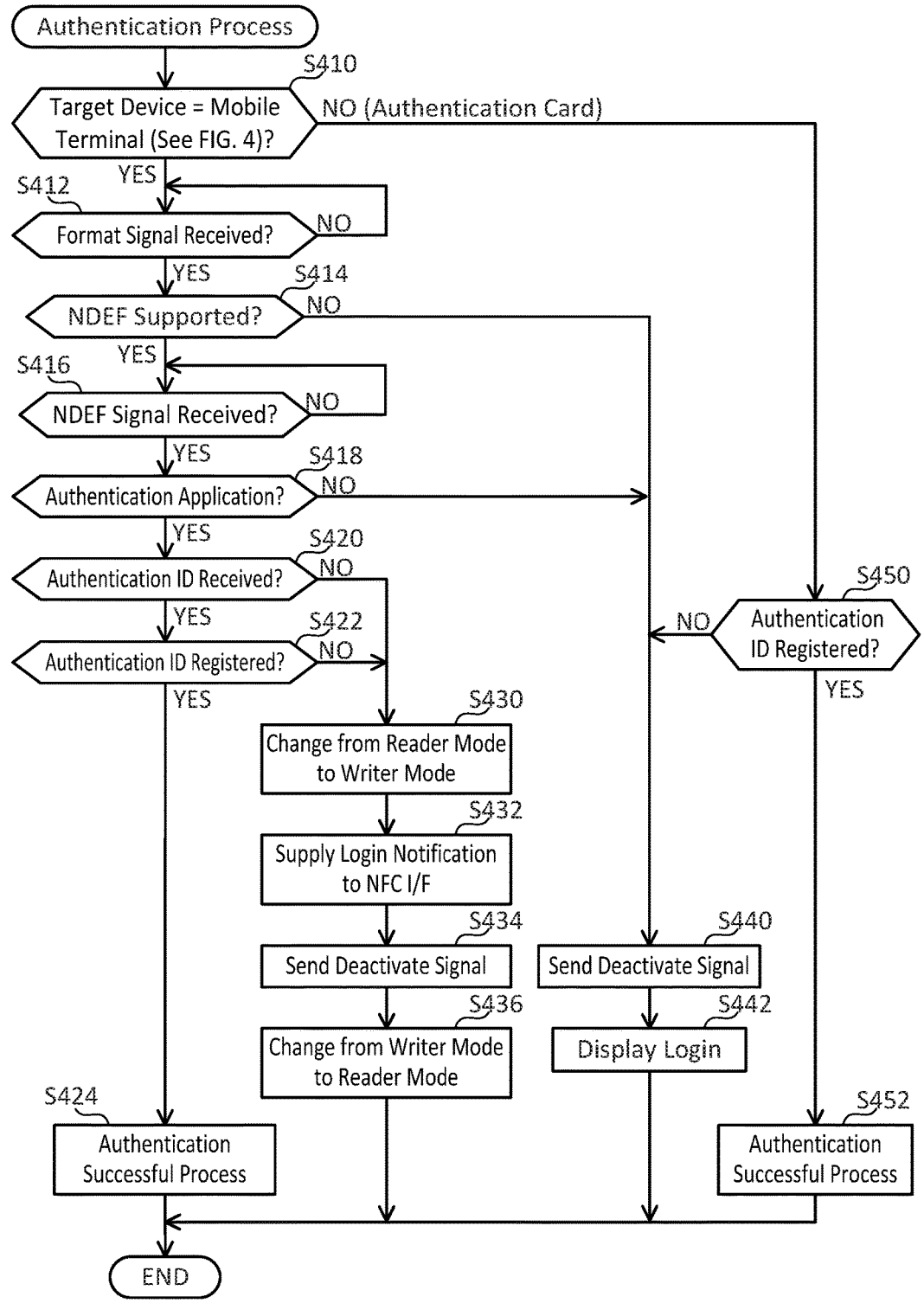
FIG. 7 shows a flowchart of an authentication process.

(Authentication Process; FIG. 7)

Next, an authentication process executed in S52 of FIG. 2 will be described with reference to FIGS. 7. S410 to S422 are the same as S110 to S122 of FIG. 3. The process proceeds to S450 in case of NO in S410, proceeds to S440 in case of NO in S414 or S418, and proceeds to S430 in case of NO in S420 or S422.

In S424, the CPU 32 allows the use of functions corresponding to each allowing information associated with the authentication ID included in the NDEF information. Specifically, in a case where the print permission information is "OK", the CPU 32 permits execution of printing. For example, when an operation for downloading print data from a server on the Internet is executed on the operation unit 12 by the user, the CPU 32 can receive the print data, and cause the print executing unit 16 to execute printing of an image represented by the print data. Further, in a case where the scan permission information is "OK", the CPU 32 permits execution of scanning For example, when an operation for executing a scan is executed on the operation unit 12 by the user, the CPU 32 causes the scan executing unit 18 to scan a document. When S424 ends, the process of FIG. 7 ends. in this way, according to the present embodiment, by bringing the mobile terminal 70 closer to the MFP 10, the user can cause the MFP 10 to execute authentication using the authentication ID. The user can cause the MFP 10 to execute the function without executing the login operation in which the user ID and password are input to the MFP 10 (NO in S20 of FIG. 2).

S430 is the same as S314 of FIG. 6. In S432, the CPU 32 supplies a login notification to the NFC I/F 20 requesting execution of the login operation (see S20 of FIG. 2) and of the registration button operation (see S30). In this case, the NFC I/F 20 sends the login notification to the mobile terminal 70 by using the NFC communication session established in S50 of FIG. 2. Thus, the mobile terminal 70 displays the login notification. Thus, the user can know that the login operation to the MFP 10 and the registration button operation are to be executed. S434, S436 are the same as S324, S326 of FIG. 6, respectively. When S436 ends, the process of FIG. 7 ends.

Further, S440 is the same as S324 of FIG. 6. In S442, the CPU 32 causes the display unit 14 to display a login screen requesting execution of the login operation (see S20 of FIG. 2) and of the registration button operation (see S30), whereby the user can know that the login operation to the MFP 10 and the registration button operation are to be executed.

Further, S450, S452 are the same as S422, S424, except-ing the point that a device ID (i.e., the NFCID1, the NFCID2, or the UID (see FIG. 2)) received from the authentication card 50 is used. In this way, according to the present embodiment, by bringing the authentication card 50 closer to the MFP 10, the user can cause the MFP 10 to execute the authentication using the authentication ID. The user can cause the MFP 10 to execute the function without executing the login operation in which the user ID and password are input to the MFP 10 (NO in S20 of FIG. 2).

(Specific Cases)

Next, specific cases A to C realized by the processes of FIG. 2 to FIG. 7 will be described with reference to FIG. 8 to FIG. 10. In the initial status of each case, the authentication mode of the MFP 10 is set to "ON", and consequently the operation mode of the NFC I/F 20 is set to "R/W mode=ON" and "CE mode=OFF", and is set to be operable only in the Reader mode of the R/W mode (S10 of FIG. 2).

(Case A; FIG. 8)

In case A, the target device is the mobile terminal 70 corresponding to type A, and is the mobile terminal 70 in which the authentication application 76 is not installed.

In T10, the MFP 10 repeatedly sends, in sequence, each Polling signal corresponding to types A, F, or V (S10 of FIG. 2).

In T20, the MFP 10 accepts input (i.e., a login operation) of the user information including the combination of a user name "U3" and a password "P3" (YES in S20 of FIG. 2) and, in T22, accepts operation of the registration button (YES in S30).

When the user brings the mobile terminal 70 close to the MFP 10, and the mobile terminal 70 receives the Polling signal corresponding to type A from the MFP 10 whereupon, in T28, the OS software 74 of the mobile terminal 70 randomly generates a character string, and determines the character string as NFCID1 "B1".

In T30, in response to the sending of the Polling signal of type A, the MFP 10 receives a response signal from the mobile terminal 70 including the data size "4 bytes" of the NFCID1, the NFCID1 "B1", and the ISO_DEP information "ON" (YES in S40), and establishes the NFC communication session with the mobile terminal 70.

Since the ISO_DEP information indicates "ON", and the data size information of the NFCID I indicates "4 bytes", the MFP 10 determines that the target device is the mobile terminal 70 (YES in S110 of FIG. 3.). Then, the MFP 10 sends a request signal to the mobile terminal 70 by using the NFC communication session established in T30 and, in T32, receives a Format signal including the Format information "NDEF=OFF" from the mobile terminal 70 (YES in S112).

The MFP 10 determines that the mobile terminal 70 does not support NDEF (NO in S114) and, in T40, sends the Deactivate signal to the mobile terminal 70 (S210 of FIG. 5). Thus, the communication session established in T30 is disconnected. In T42, the MFP 10 changes the operation mode of the NFC I/F 20 to "R/W mode=OFF" and "CE mode=ON" (S220), and supplies the URL 39 to the NFC I/F 20 (S222).

In T50, the MFP 10 receives the Polling signal corresponding to type A from the mobile terminal 70, sends a response signal to the mobile terminal 70, and establishes an NFC communication session. Then, in T60, the MFP 10 receives the Read signal from the mobile terminal 70 (YES in S230) by using the NFC communication session established in T50 and, in T70, sends the URL 39 to the mobile terminal 70.

In T72, the mobile terminal 70 accesses the URL 39 by using a web browser (not shown), and displays an install screen for installing the authentication application 76. In T74, the mobile terminal 70 installs the authentication application 76 in response to the user operating the mobile terminal 70. When the user operates the mobile terminal 70, the distance between the MFP 10 and the mobile terminal 70 increases, and the NFC communication session established in T50 is disconnected.

Upon detecting Deactivate (YES in S232), in T80, the MFP 10 changes the operation mode of the NFC I/F 20 to "R/W mode=ON" and "CE mode=OFF", causing the NFC I/F 20 to operate only in the Reader mode of the R/W mode (S240).

(Case B; FIG. 9)

Next, a case B will be described with reference to FIG. 9. Case B is a continuation of case A of FIG. 8, and the authentication application 76 has been installed in the mobile terminal 70 (T74 of FIGS. 8). T120 to T130 of FIG. 9 are the same as T20 to T30 of FIG. 8, excepting the point that the NFCID1 generated by the mobile terminal 70 is "B2". Further, T132 is the same as T32 of FIG. 8, excepting the point that the NDEF information indicates "ON" due to the authentication application 76 having been installed in the mobile terminal 70.

Based on the Format information "NDEF=ON", the MFP 10 determines that the mobile terminal 70 supports the NDEF (YES in S114 of FIG. 3) and, in T134, receives an NDEF signal including the application ID "ZZZ" and writing information "ON" (YES in S116) by using the NFC communication session established in T130. The NDEF signal does not include the authentication ID. As a result, the MFP 10 determines that the authentication application 76 has been installed in the mobile terminal 70 (YES in S118), determines that the authentication ID has not been received (NO in S120), and determines that it is possible to execute writing of information to the mobile terminal 70 (YES in S310 of FIG. 6).

In T140, without disconnecting the NFC communication session established in T130, the MFP 10 changes the operation mode of the NFC I/F 20 to a mode capable of operating only in the Writer mode of the R/W mode (S314) and, in T150, sends an assignment ID "XXX02" to the mobile terminal 70 (S316).

Upon receiving the assignment ID "XXX02" from the MFP 10, in T152 the mobile terminal 70 registers the assignment ID "XXX02" as the authentication ID and, in T154, sends the writing completion notification to the MFP 10.

Upon receiving the writing completion notification (YES in S320), in T160, the MFP 10 registers the assignment ID "XXX02" in the user table 38 as the authentication ID corresponding to the user name "U3" and the password "P3" (S322). T170 is the same as T40 of FIG. 8. In T172, the MFP 10 changes the operation mode of the NFC I/F 20 to a mode capable of operating only in the Reader mode of the R/W mode (S326) and, in T174, generates a new assignment ID "XXX03" (S328).

Figure 8:
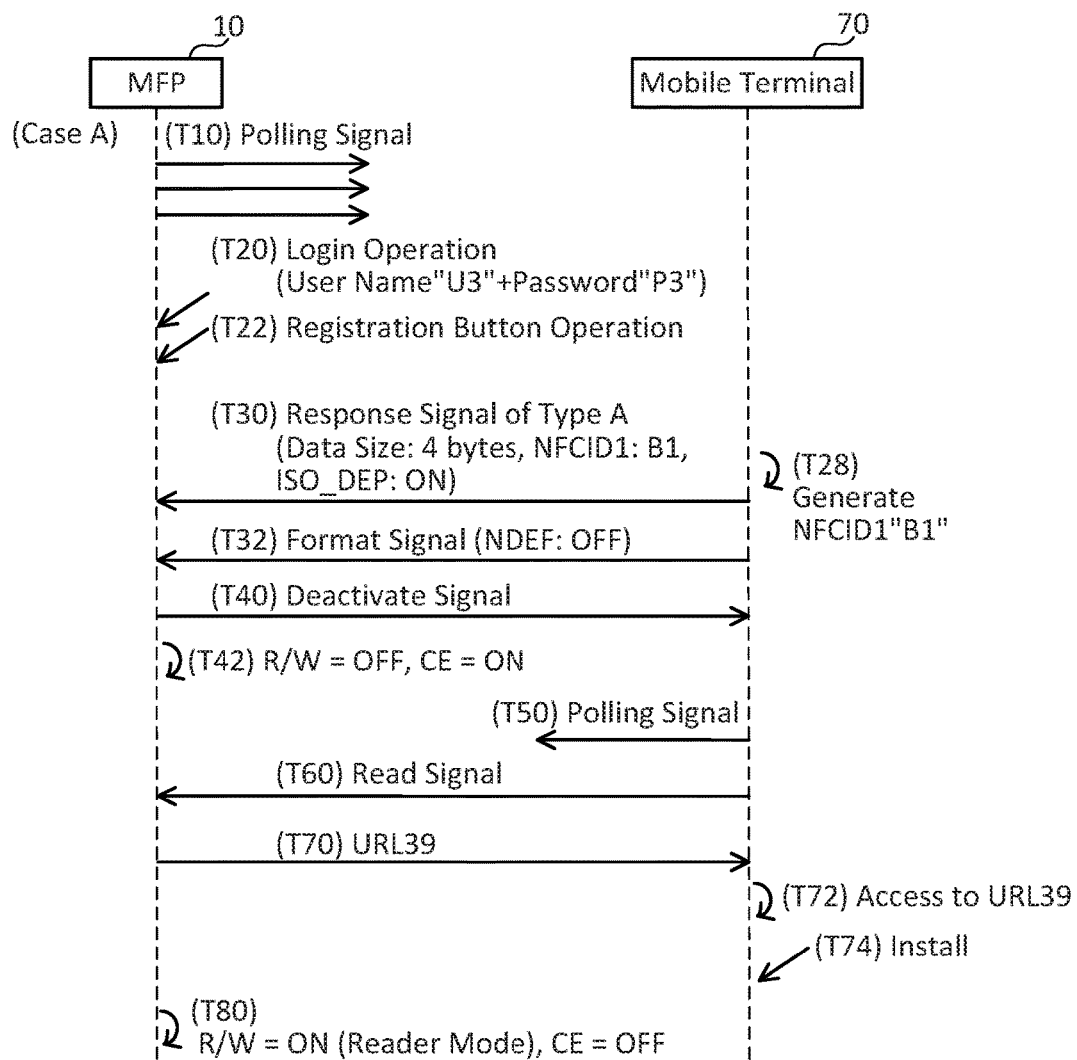
FIG. 8 shows a sequence diagram of a case A of sending a URL to a mobile terminal.

T210 is the same as T10 of FIG. 8. Here, the login operation and the registration button operation are not executed (NO in S20 of FIGS. 2). T228 to T232 are the same as T128 to T132, excepting the point that the NFCID1 generated by the mobile terminal 70 is "B3" (YES in S50, YES in S412 of FIG. 7). Further, T234 is the same as T134 (YES in S416), excepting the point that the NDEF signal includes the authentication ID "XXX02" due to the fact that the authentication ID "XXX02" has been registered in the mobile terminal 70 (T152).

The MFP 10 determines that the NDEF signal includes the authentication ID "XXX02" (YES in 5420) and, in T236, determines that the authentication ID "XXX02" is registered in the user table 38 (YES in S422). Thus, the MFP 10 can execute the printing function allowed for the user "U3".

(Effect of Present Embodiment)

According to the present embodiment, the MFP 10 operates in the Reader mode in the initial status. Consequently, the MFP 10 can receive the authentication ID from the authentication card 50, and execute an authentication using the authentication ID (YES in S50 of FIG. 2, S450 of FIG. 7). Further, the MFP 10 can receive the authentication ID from the mobile terminal 70, and execute an authentication using the authentication ID (YES in S50 of FIG. 2, S422 of FIG. 7). Then, in order to assign the authentication ID to the mobile terminal 70, the MFP 10 operates as follows. That is, based on the Format signal and the NDEF signal received from the mobile terminal 70, the MFP 10 determines whether the authentication application 76 has been installed in the mobile terminal 70 (S114, S118 of FIG. 3). In case of determining that the authentication application 76 is not installed in the mobile terminal (NO in S114, NO in S118), the MFP 10 changes the operation mode of the NFC I/F 20 from the Reader mode to the CE mode (S220 of FIG. 5). Then, in a state where the NFC I/F 20 operates in the CE mode, the MFP 10 sends the URL 39 to the mobile terminal 70 (S222). Thus, the authentication application 76 can be installed in the mobile terminal 70. On the other hand, in case of determining that the authentication application 76 has been installed in the mobile terminal 70 (YES in S114 of FIG. 3, and YES in S118), the MFP 10 changes the operation mode of the NFC I/F 20 from the Reader mode to the Writer mode (S314 of FIG. 6). Then, in a state where the NFC I/F 20 operates in the Writer mode, the MFP 10 sends the assignment ID 40 to the mobile terminal 70 (S316 of FIG. 6). Thus, the assignment ID 40 can be assigned to the mobile terminal 70 as the authentication ID. Thus, the MFP 10 can appropriately change the operation mode of the NFC I/F 20 in response to the information included in the Format signal and the NDEF signal received from the mobile terminal 70.

(Correspondence Relationship)

The MFP 10 and the mobile terminal 70 are an example of "communication device" and "terminal device", respectively. The authentication application 76 is an example of "predetermined application". The Format information and the application ID are examples of "install information". The URL 39 is an example of "first identification information". The assignment ID 40 is an example of "specific information" and "target authentication information". The Format signal received in S112 and the NDEF signal received in S116 of FIG. 3 are examples of "first specific signal". The Format signal received in S412 and the NDEF signal received in S416 of FIG. 7 are an example of "second specific signal" and "third specific signal". The NFC communication session established in S40 of FIG. 2, and the communication session established in S230 of FIG. 5 are an example of "first communication session" and "second communication session", respectively. The login notification in S432 of FIG. 7 is an example of "instruction information".

(Modification 1)

In a case where the operation to change the operation mode of the NFC I/F 20 from the Reader mode to the Writer mode is executed on the operation unit 12 by the user after S234 of FIG. 5 or after S324 of FIG. 6, the CPU 32 may return the operation mode of the NFC I/F 20 to the initial status. In the present modification, "change the operation mode of the NFC interface from the CE mode to the Reader mode without accepting an operation from a user in a case where the first identification information has been sent to the terminal device " and "change the operation mode of the NFC interface from the Writer mode to the Reader mode without accepting the operation from the user in a case where the specific information has been sent to the terminal device " can be omitted.

(Modification 2)

Before S314 of FIG. 6, the NFC I/F 20 may send the Deactivate signal to the mobile terminal 70 for disconnecting the NFC communication session established in S40 of FIG. 2. Then, in a case where the NFC communication session with the mobile terminal 70 is re-established, the process of S314 and subsequent processes may be executed. That is, "NFC interface" may send the specific information to the terminal device by using a communication session re-established after disconnection of the first communication session.

(Modification 3)

S340 of FIG. 6 may be omitted. In this case, in a case where the NFC communication session with the target device is re-established, the CPU 32 executes the process of S316 of FIG. 6 and subsequent processes. In the present modification, "change the operation mode of the NFC interface from the Writer mode to the Reader mode in a case where the first communication session has been disconnected before the sending of the specific information to the terminal device is completed" can be omitted.

(Modification 4)

"Predetermined application" may not be the authentication application 76, but may be an application for receiving, from the MFP 10, network information (e.g., SSID (abbreviation of Service Set IDentifier), authentication system, encryption system, password, IP address, etc.) to be used in Wi-Fi communication, and for using the network information. In this case, instead of the registration process of S42 of FIG. 2, the CPU 32 executes a network information sending process. In the network information sending process, in a case of determining that the application is not installed in the mobile terminal 70, the CPU 32 supplies a URL corresponding to the application to the NFC I/F 20, and sends the URL to the mobile terminal 70. Further, in a case of determining that the application is not installed in the mobile terminal 70, the CPU 32 supplies the network information to the NFC I/F 20, and sends the network information to the mobile terminal 70. Thus, the mobile terminal 70 can execute the Wi-Fi communication with the MFP 10 by using the network information.

(Modification 5)

S430 to S436 of FIG. 7 may be omitted. In the present modification, "change the operation mode of the NFC interface from the Reader mode to Writer mode in a case where the third specific signal including the install information is received" and "supply instruction information to the NFC interface without supplying the target authentication information to the NFC interface" can be omitted.

(Modification 6)

Instead of including the application ID, the NDEF signal received in S116 of FIG. 2 may include vendor information for specifying a vendor of the authentication application 76 (vendor name, ID identifying the vendor, etc.). That is, "install information" may not include "second identification information" for identifying the predetermined application.

(Modification 7)

In the case where the mobile terminal 70 supports the NDEF (YES in S414 of FIG. 7), the authentication application 76 has normally been installed in the mobile terminal 70. Consequently, the NDEF signal may not include the application ID, and S418 of FIG. 7 may be omitted. In the present modification, only the Format information is an example of "install information".

(Modification 8)

"Communication device" may not be the MFP 10 capable of executing a plurality of functions, but may be a printer capable of executing only the printing function, a scanner capable of executing only the scanning function, a PC, a server, a mobile terminal, etc.

(Modification 9)

In the above embodiment, each of the processes of FIG. 2 to FIG. 7 is implemented by the CPU 32 of the MFP 10 executing the program 36 (i.e., software). Instead, at least one of the processes of FIG. 2 to FIG. 7 may be implemented by hardware such as a logic circuit.

What is claimed is:

1. A communication device comprising:
   a Near Field Communication (NFC) interface configured to perform a wireless communication according to NFC standard;
   a processor; and
   a memory storing computer-readable instructions therein, the computer-readable instructions, when executed by the processor, causing the communication device to:
   receive a specific signal from a terminal device via the NFC interface in a case where the NFC interface operates in a Reader mode of the NFC standard and the terminal device operates in a Card Emulation (CE) mode of the NFC standard;
   determine whether the specific signal includes install information which indicates that a predetermined application has been installed in the terminal device, the predetermined application being an application for causing the terminal device to execute a wireless communication with the communication device using specific information;
   change an operation mode of the NFC interface from the Reader mode to the CE mode in a case where it is determined that the specific signal does not include the install information;
   change the operation mode of the NFC interface from the Reader mode to a Writer mode in a case where it is determined that the specific signal includes the install information;
   supply information for installing the predetermined application in the terminal device to the NFC interface in a case where the NFC interface operates in the CE mode, wherein the information for installing the predetermined application in the terminal device is for identifying the predetermined application and is different from the specific information,
   wherein the NFC interface sends the information for installing the predetermined application in the terminal device to the terminal device in a case where the NFC interface operates in the CE mode and the terminal device operates in the Reader mode;
   supply the specific information to the NFC interface in a case where the NFC interface operates in the Writer mode, wherein the NFC interface sends the specific information to the terminal device in a case where the NFC interface operates in the Writer mode and the terminal device operates in the CE mode; and
   after the specific information has been sent to the terminal device, execute a wireless communication with the terminal device using the specific information sent to the terminal device.

2. The communication device as in claim 1, wherein the computer-readable instructions, when executed by the processor, further cause the communication device to:

change the operation mode of the NFC interface from the CE mode to the Reader mode without accepting an operation from a user in a case where the information for installing the predetermined application in the terminal device has been sent to the terminal device; and change the operation mode of the NFC interface from the Writer mode to the Reader mode without accepting an operation from the user in a case where the specific information has been sent to the terminal device.

3. The communication device as in claim 1, wherein the specific signal is received from the terminal device via the NFC interface by using a first communication session established between the NFC interface and the terminal device, the computer-readable instructions, when executed by the processor, further cause the communication device to:

disconnect the first communication session in a case where it is determined that the specific signal does not include the install information, wherein the first communication session is not disconnected in a case where it is determined that the specific signal includes the install information, wherein the NFC interface sends the information for installing the predetermined application in the terminal device to the terminal device by using a second communication session established between the NFC interface and the terminal device, in a case where the NFC interface operates in the CE mode and the terminal device operates in the Reader mode after the first communication session has been disconnected, and the NFC interface sends the specific information to the terminal device by using the first communication session, in a case where the NFC interface operates in the Writer mode and the terminal device operates in the CE mode.

4. The communication device as in claim 3, wherein the computer-readable instructions, when executed by the processor, further cause the communication device to:

change the operation mode of the NFC interface from the Writer mode to the Reader mode in a case where the first communication session has been disconnected before the sending of the specific information to the terminal device is completed.

5. The communication device as in claim 1, wherein the predetermined application is an application for sending authentication information to the communication device and for causing the communication device to execute an authentication using the authentication information, the specific information is target authentication information which is authentication information assigned to the terminal device, and the executing of the wireless communication with the terminal device using the sent specific information comprises:

receiving the target authentication information from the terminal device via the NFC interface, in a case where the NFC interface operates in the Reader mode and the terminal device operates in the CE mode after the specific information which is the target authentication information has been sent to the terminal device;

wherein the computer-readable instructions, when executed by the processor, further cause the communication device to:

execute an authentication using the received target authentication information in a case where the target authentication information is received.

6. The communication device as in claim 1, wherein the specific signal is received from the terminal device via the NFC interface in a case where the NFC interface operates in the Reader mode and the terminal device operates in the CE mode while in a state where a specific user is logging in the communication device, the computer-readable instructions, when executed by the processor, further cause the communication device to:

receive install information from the terminal device via the NFC interface in a case where the NFC interface operates in the Reader mode and the terminal device operates in the CE mode in a state where the specific user is not logging in the communication device after the information for installing the predetermined application in the terminal device has been sent to the terminal device;

change the operation mode of the NFC interface from the Reader mode to Writer mode in a case where the install information is received; and supply instruction information to the NFC interface without supplying the target authentication information to the NFC interface in a case where the NFC interface operates in the Writer mode as a result of receiving the install information, wherein the NFC interface sends the instruction information to the terminal device in a case where the NFC interface operates in the Writer mode and the terminal device operates in the CE mode, the instruction information being for instructing login to the communication device.

7. The communication device as in claim 1, wherein the install information includes information for identifying the predetermined application.

8. The communication device as in claim 1, wherein the NFC interface is incapable of operating in a Peer to Peer (P2P) mode of the NFC standard.

9. A non-transitory computer-readable recording medium storing computer-readable instructions for a communication device, wherein the computer-readable instructions, when executed by a processor of the communication device, causing the communication device to:

receive a specific signal from a terminal device via a Near Field Communication (NFC) interface in a case where the NFC interface operates in a Reader mode of NFC standard and the terminal device operates in a Card Emulation (CE) mode of the NFC standard, the NFC interface being configured to perform a wireless communication according to the NFC standard;

determine whether the specific signal includes install information which indicates that a predetermined application has been installed in the terminal device, the predetermined application being for causing the terminal device to execute a wireless communication with the communication device using specific information;

change an operation mode of the NFC interface from the Reader mode to the CE mode in a case where it is determined that the specific signal does not include the install information;

change the operation mode of the NFC interface from the Reader mode to a Writer mode in a case where it is determined that the specific signal includes the install information;

supply information for installing the predetermined application in the terminal device to the NFC interface in a case where the NFC interface operates in the CE mode, wherein the information for installing the predetermined application in the terminal device is for identifying the predetermined application and is different from the specific information, wherein the NFC interface sends the information for installing the predetermined application in the terminal device to the terminal device in a case where the NFC interface operates in the CE mode and the terminal device operates in the Reader mode;

supply specific information to the NFC interface in a case where the NFC interface operates in the Writer mode, wherein the NFC interface sends the specific information to the terminal device in a case where the NFC interface operates in the Writer mode and the terminal device operates in the CE mode; and after the specific information has been sent to the terminal device, execute a wireless communication with the terminal device using the specific information sent to the terminal device.

10. A method performed by a communication device, the method comprising:

receiving a specific signal from a terminal device via a Near Field Communication (NFC) interface in a case where the NFC interface operates in a Reader mode of NFC standard and the terminal device operates in a Card Emulation (CE) mode of the NFC standard, the NFC interface being configured to perform a wireless communication according to the NFC standard;

determining whether the specific signal includes install information which indicates that a predetermined application has been installed in the terminal device, the predetermined application being an application for causing the terminal device to execute a wireless communication with the communication device using specific information;

changing an operation mode of the NFC interface from the Reader mode to the CE mode in a case where it is determined that the specific signal does not include the install information;

changing the operation mode of the NFC interface from the Reader mode to a Writer mode in a case where it is determined that the specific signal includes the install information;

supplying information for installing the predetermined application in the terminal device to the NFC interface in a case where the NFC interface operates in the CE mode, the information for installing the predetermined application in the terminal device is for identifying the predetermined application, wherein the NFC interface sends the information for installing the predetermined application in the terminal device to the terminal device in a case where the NFC interface operates in the CE mode and the terminal device operates in the Reader mode;

supplying specific information to the NFC interface in a case where the NFC interface operates in the Writer mode, wherein the NFC interface sends the specific information to the terminal device in a case where the NFC interface operates in the Writer mode and the terminal device operates in the CE mode; and executing a wireless communication with the terminal device using the specific information sent to the terminal device, after the specific information has been sent to the terminal device.

11. A communication device comprising:

a Near Field Communication (NFC) interface configured to perform a wireless communication according to NFC standard;

a processor; and a memory storing computer-readable instructions therein, the computer-readable instructions, when executed by the processor, causing the communication device to:

receive a specific signal from a terminal device via the NFC interface, the specific signal indicates whether a predetermined application has been installed in the terminal device, the predetermined application being an application for causing the terminal device to execute a wireless communication with the communication device using specific information;

set an operation mode of the NFC interface in a first operation mode in a case where the specific signal indicates that the predetermined application has not been installed in the terminal device;

supply information for installing the predetermined application in the terminal device to the NFC interface in a case where the NFC interface is set in the first operation mode, wherein the information for installing the predetermined application in the terminal device is for identifying the predetermined application and is different from the specific information, wherein the NFC interface sends the information for installing the predetermined application in the terminal device to the terminal device under a state where the NFC interface operates in the first operation mode;

set the operation mode of the NFC interface in a second operation mode in a case where the specific signal indicates that the predetermined application has been installed in the terminal device;

supply the specific information to the NFC interface in a case where the NFC interface is set in the second operation mode, wherein the NFC interface sends the specific information to the terminal device under a state where the NFC interface operates in the second operation; and after the specific information has been sent to the terminal device, execute a wireless communication with the terminal device using the specific information sent to the terminal device.

* * * * *